United States Patent
Billmyer et al.

(10) Patent No.: US 6,557,255 B2
(45) Date of Patent: May 6, 2003

(54) METHOD OF CONSTRUCTING A TRANSFER PANEL ASSEMBLY

(75) Inventors: Bryan A. Billmyer, Springfield, MO (US); Mark E. Wilson, Springfield, MO (US)

(73) Assignee: Central States Industrial Equipment & Services, Inc., Springfield, MO (US)

( * ) Notice: Subject to any disclaimer, the term of this patent is extended or adjusted under 35 U.S.C. 154(b) by 38 days.

(21) Appl. No.: 09/851,735

(22) Filed: May 9, 2001

(65) Prior Publication Data

US 2001/0019207 A1 Sep. 6, 2001

Related U.S. Application Data

(62) Division of application No. 09/295,956, filed on Apr. 21, 1999, now Pat. No. 6,254,143.

(51) Int. Cl.⁷ .................................. B23P 11/00
(52) U.S. Cl. ..................... 29/890.032; 29/407.09; 29/407.1; 285/134.1; 285/136.1
(58) Field of Search ............. 29/890.032, 890.038, 29/890.04, 890.053, 890.054, 890.142, 890.149, 407.01, 407.09, 407.1, 464, 890.147; 285/134.1, 135.1, 135.2, 135.3, 135.4, 135.5, 136.1, 141.1, 213, 215

(56) References Cited

U.S. PATENT DOCUMENTS

| | | |
|---|---|---|
| 718,609 A | 1/1903 | Drake |
| 1,644,188 A | 10/1927 | Hawley |
| 1,703,241 A | 2/1929 | Kendall |
| 1,889,874 A | 12/1932 | Obert |
| 2,223,648 A | 12/1940 | Wachowitz |
| 2,267,314 A | 12/1941 | Stikeleather |
| 2,966,340 A | 12/1960 | Chapman |
| 3,242,334 A | 3/1966 | Hansen |
| 3,447,603 A | 6/1969 | Jones |

(List continued on next page.)

FOREIGN PATENT DOCUMENTS

| | | | |
|---|---|---|---|
| FR | 2229010 | | 5/1974 |
| JP | 404172238 A | * | 6/1992 |
| JP | 09257759 A | * | 10/1997 |

OTHER PUBLICATIONS

Brochure, "Flow Transfer Panels," Central States Industrial Equipment & Service, Inc., Springfield, MO, four pages, Mar. 1997.
Brochure, "Meeting the Needs of Today's High Purity Industries," Central States Industrial Equipment & Service, Inc., Springfield, MO, four pages, Apr. 1998.
Brochure, "Thomsen Quality Stainless Steel Flow Equipment," L. C. Thompsen, Inc., Kenosha, WI, two pages (no date).

Primary Examiner—Gregory Vidovich
Assistant Examiner—Jermie E. Cozari
(74) Attorney, Agent, or Firm—Alvin R. Wirthlin

(57) ABSTRACT

A panel assembly for transferring fluids from one location to another comprises a panel structure with openings, a nozzle projecting through each opening and a sleeve affixed between the nozzle and its respective opening. Each nozzle includes a tubular portion with a connection end adapted for connection to a transfer conduit. The connection ends of the nozzles are preferably aligned with a common reference plane. Each sleeve has an outer surface with a length that is greater than a combination of a thickness of the panel and any deformity on the panel. With this arrangement, alignment of the connection ends with the common reference plane is independent of any deformity on the panel. A method of constructing a panel assembly includes determining if any defects are present on the inner surface of the tubular portion before installing the nozzle on the panel, and precluding potential inner surface defects during installation of the nozzle on the panel.

18 Claims, 4 Drawing Sheets

U.S. PATENT DOCUMENTS

| | | |
|---|---|---|
| 3,505,989 A | 4/1970 | Truhan |
| 3,747,504 A | 7/1973 | Turko et al. |
| 4,171,559 A * | 10/1979 | Vyse et al. ............... 29/407.01 |
| 4,304,224 A | 12/1981 | Fortney |
| 4,322,598 A | 3/1982 | Blair |
| 4,352,714 A | 10/1982 | Patterson et al. |
| 4,377,969 A | 3/1983 | Nelson |
| 4,627,647 A | 12/1986 | Hauff |
| 4,630,415 A | 12/1986 | Attwell |
| 4,667,580 A | 5/1987 | Wetzel |
| 4,676,144 A | 6/1987 | Smith, III |
| 4,699,177 A | 10/1987 | Thomas |
| 4,976,815 A | 12/1990 | Hiratsuka et al. |
| 5,259,812 A | 11/1993 | Kleinsek |
| 5,299,584 A | 4/1994 | Miyazaki et al. |
| 5,603,457 A | 2/1997 | Sidmore et al. |

\* cited by examiner

METHOD OF CONSTRUCTING A TRANSFER PANEL ASSEMBLY

CROSS-REFERENCE TO RELATED APPLICATIONS

This application is a Divisional of U.S. patent application Ser. No. 09/295,956 filed on Apr. 21,1999 now U.S. Pat. No. 6,254,143.

DESCRIPTION OF THE RELATED ARTS

1. Technical Field

This invention relates generally to fluid transfer devices and, more particularly, to panel assemblies for diverting fluids from one location to another.

2. Description of the Related Art

Flow transfer panels are an important part of most processes and clean-in-place (CIP) systems in the food, beverage, dairy, pharmaceutical, and biopharmaceutical industries. The flow transfer panel provides the "physical break" required by most processing regulations and current Good Manufacturing Practices (cGMP's). In addition, flow transfer panels may be utilized for fluid diversion and delivery in industries where sanitary conditions and the inherent "physical break" are not process requirements.

As shown in FIG. 1, a typical transfer panel 10 generally includes a vertically oriented panel 12 and nozzles 14 that extend through the panel and are welded or otherwise attached thereto. Each nozzle includes a ferrule 16 formed at the end of a tube 18 and a mounting ring 19 formed on the tube and spaced from the ferrule 18. A jumper conduit 20 has a ferrule 22 connected at the ends of a U-shaped tube 24. The ferrules 22 of the jumper conduit 20 include faces 25 that mate with faces 26 of the ferrules 16. The ferrules 22 are connected to the ferrules 16 through clamps or the like to thereby direct the flow of fluid from one pipe to another.

The flow transfer panel 10 may be mounted on a floor, wall, or ceiling through appropriate supports and/or brackets, and provides a basic support structure for several nozzles and jumper conduits that may extend between one or more pairs of nozzles. Generally, flow transfer panels provide a physical break required by some processing regulations and assure that products will not be cross contaminated with other products or with CIP solutions that are used for cleaning the interior of conduits or pipes associated with fluid processing.

Assembly of the nozzles to the transfer panel typically involves forming openings in the panel 12 then inserting the tube 18 of each nozzle in one of the openings such that the ferrule 16 is located on one side 24 of the panel with the tube 18 extending through the panel. The nozzle 14 is then affixed to the panel by welding the outer perimeter of the ring 19 to the panel 12. With this arrangement, the distance between the panel and an outer face 26 of the ferrule 16 of each nozzle must be referenced from the side 24 of the panel, since the ring 19 is spaced at a fixed distance from the ferrule 16. Ideally, the outer faces 26 of the ferrules 16 should lie in a common plane 28. Although care is taken to provide a flat panel 12, dips 30 and bows 32 in the panel may occur during formation of the panel itself, and may be further augmented by subsequent manufacturing processes, such as stamping, forming openings in the panel, welding of the nozzles to the panel, and the like. It has been observed that for a 0.25 inch thick plate, the dips and bows may vary by as much as 0.25 inch or more over the area of the plate, which in some applications may be quite large. Consequently, the outer faces 26 of the ferrules do not lie along a common plane 28. When a jumper conduit 20 is connected to the ferrules under these circumstances, a gap "A" between a first pair of opposing faces 25 and 26 may be greater than a gap "B" between a second pair of opposing faces of ferrules 16 and 22. When the jumper conduit is installed on the nozzles 14, the gap "B" is closed, while the gap "A" may still be present. Consequently, leakage may occur at the junction of the ferrules 16 and 22 and contaminants may enter the processing line. In some cases, undue internal stresses may be created in the jumper conduit during an attempt to close gap "A" when assembling the jumper conduit to the nozzles. In many instances custom jumper conduits must be constructed, typically at the assembly sight away from the manufacturer, to accommodate the dips, bows and other deformities of the transfer panel, resulting in increased manufacturing and installation time, labor, and expense.

The above-described problems are further augmented by surface defects that may be present on the inner surface of the tube 18 during manufacture or during assembly to the panel 12. In many cases, the surface defects are not readily observable or cannot be measured until after an electro-polishing operation wherein the inner surface of the nozzle 14 is given a smooth, mirror-like finish. Even when the surface contains no visible or discernible defects before electro-polishing, the electro-polishing operation itself may uncover pits in the surface. This is especially prevalent where the surface is mechanically finished before electro-polishing. Mechanical finishing often fills pits and other defects in the surface due to welding or other manufacturing operations. Since a layer of material is removed from the surface during electro-polishing, some of the pits and other defects may be uncovered. In many manufacturing environments, the electro-polishing operation itself is inherently non-repetitive, since factors such as electrolyte concentration, temperature, and immersion time of the surface in the electrolyte may vary. Discontinuities in the finish can encourage contamination and bacteria growth and therefore are unacceptable in sterile processing environments. When surface defects are detected after the nozzle is installed in the panel, the nozzle must either be ground out, which is a labor-intensive and time-consuming procedure, or the panel must be discarded.

In an attempt to overcome surface defects in the nozzle that may be caused from welding the nozzle directly to the panel assembly, U.S. Pat. No. 5,603,457 issued to Sidmore et al. on Feb. 18, 1997, proposes forming a ring on the nozzle and an enlarged opening in the panel for receiving the ring. The outer periphery of the ring is then welded to the panel and the welding bead is subsequently removed during a grinding operation. Although the ring effectively relocates the welding operation to a location spaced from the nozzle, the ring is the same thickness as the panel. The distance from the panel to a connection end of the nozzle must therefore be referenced from the panel itself. Consequently, the connection ends of nozzles on the panel may not lie in the same plane due to dips, bows and other imperfections in the panel.

SUMMARY OF THE INVENTION

According to the present invention, a method of constructing a panel assembly for transferring fluids from one location to another includes providing a panel with at least one opening, forming at least one nozzle with a tubular portion and at least one connection end, forming a sleeve on the tubular portion, the sleeve having an outer surface with an axial length that is greater than a combination of a thickness of the panel and any deformity on the panel, polishing an inner surface of the tubular portion, inspecting the inner surface for defects; and installing the at least one nozzle on the panel by a) inserting the tubular portion into the at least one opening in the panel until the sleeve is positioned within the at least one opening, and b) affixing the outer surface of the sleeve to the panel in the vicinity of the at least one opening. With this method, defects that may be present on the inner surface of the tubular portion can be discovered before installing the nozzle on the panel, and potential inner surface defects are precluded during installation of the nozzle on the panel. It is to be understood that the phrase "any deformity" refers to one or more typical deformities that may be present after manufacture of the panel itself. The length of the sleeve is preferably predetermined to accommodate these typical deformities, whether or not they are present on the panel.

According to a further embodiment of the invention,sa method of constructing a panel assembly for transferring fluids from one location to another comprises providing a panel with a plurality of openings, forming a plurality of nozzles, with each nozzle including a tubular portion and at least one connection end, forming a sleeve on each tubular portion, polishing an inner surface of each tubular portion, inspecting the inner surface of each tubular portion for defects; and installing each of a plurality of nozzles that pass the inspection step on the panel by a) inserting the tubular portion into one of the openings in the panel, b) aligning the connection end of the tubular portion in a common reference plane while positioning the sleeve within the one opening, and c) affixing an outer surface of the sleeve to the panel in the vicinity of the one opening. Alignment of the connection ends with the common reference plane is thus independent of any deformity that may exist on the panel. With this arrangement, defects that may be present on the inner surface of the tubular portion can be discovered before installing the nozzles on the panel, and potential inner surface defects are precluded during installation of the nozzles on the panel.

A panel assembly according to the present invention for transferring fluids from one location to another comprises a panel structure having at least two openings, a nozzle projection through each opening and a sleeve affixed between each nozzle and its respective opening. Each nozzle includes a tubular portion with a connection end adapted for connection to a transfer conduit. The connection ends of the nozzles are preferably aligned with a common reference plane. Each sleeve has an outer surface with a length that is greater than a combination of a thickness of the panel and any deformity on the panel. With this arrangement, alignment of the connection ends with the common reference plane is independent of any deformity that may exist on the panel.

There are, of course, additional features of the invention that will be described hereinafter which will form the subject matter of the appended claims. Those skilled in the art will appreciate that the preferred embodiments may readily be used as a basis for designing other structures, methods and systems for carrying out the several purposes of the present invention. It is important, therefore, that the claims be regarded as including such equivalent constructions since they do not depart from the spirit and scope of the present invention. The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

DETAILED DESCRIPTION OF THE PREFERRED EMBODIMENTS

Figure 1:
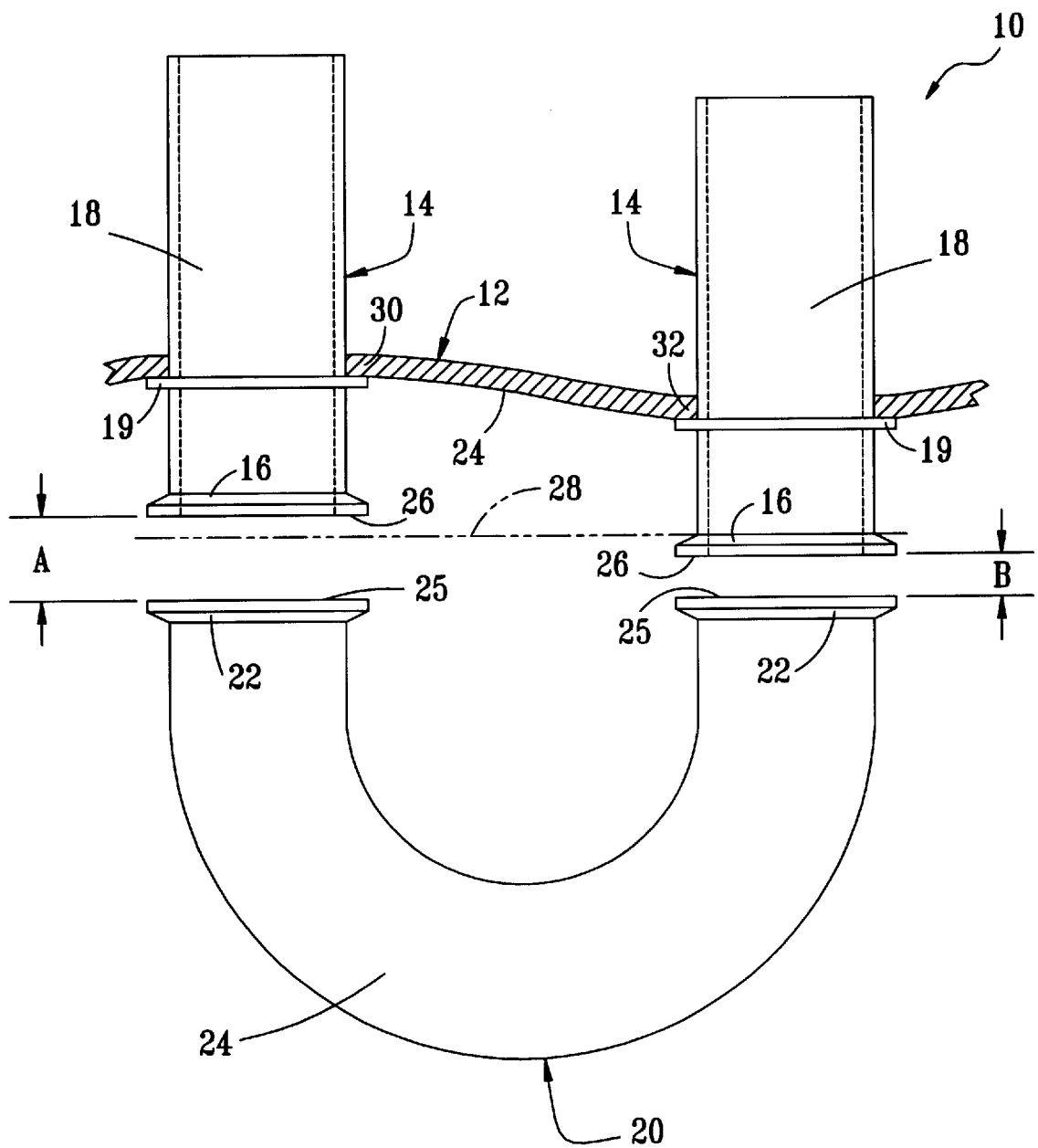
FIG. 1 is a top plan view in partial cross section of a prior art transfer panel assembly.
Figure 2:
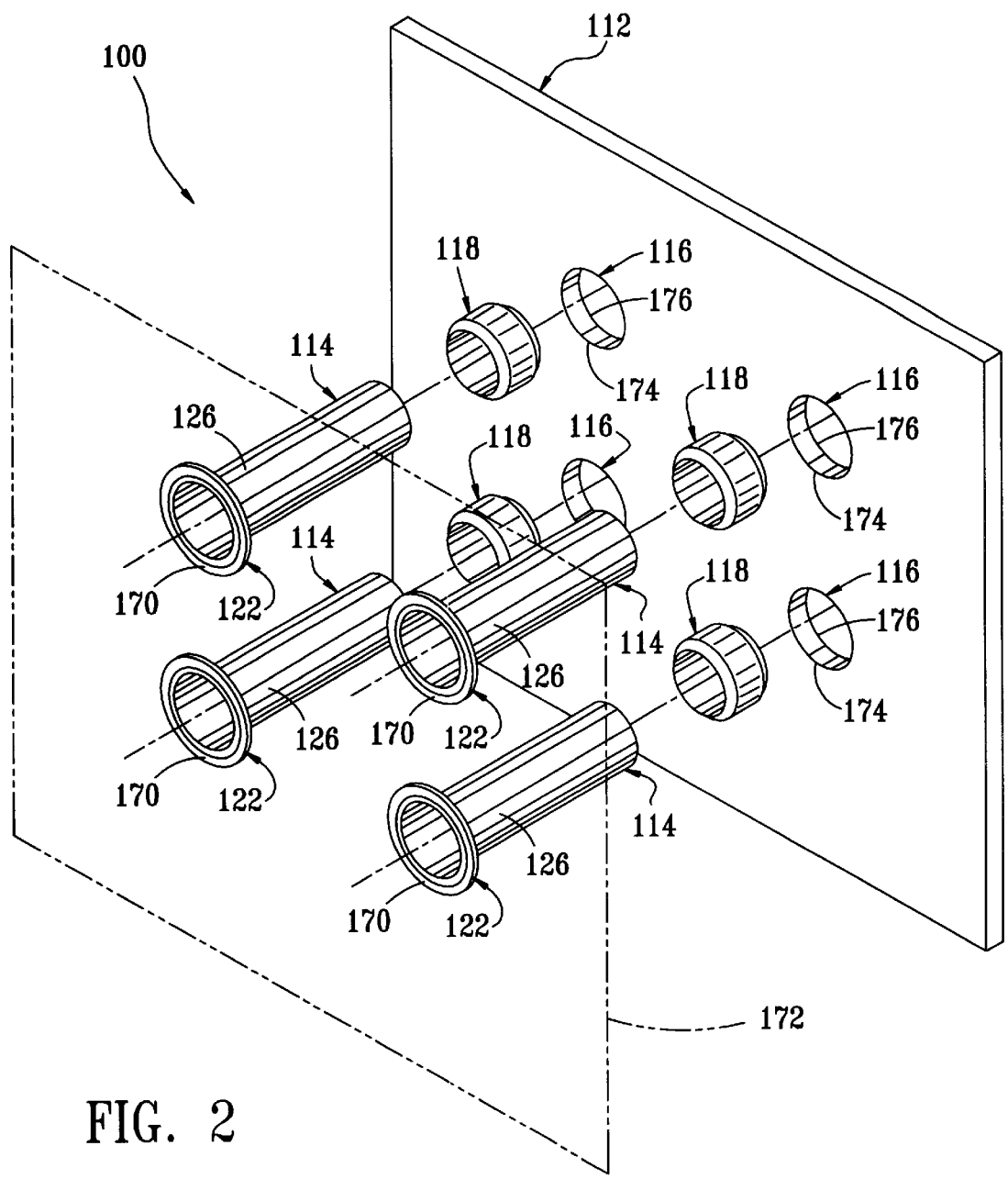
FIG. 2 is an exploded front isometric view of a transfer panel assembly according to the present invention.

Referring now to the drawings, and to FIG. 2 in particular, an exploded view of a transfer panel assembly 100 according to the present invention is illustrated. The transfer panel assembly 100 includes a generally vertically oriented panel 112, nozzles 114 adapted for extending through openings 116 in the panel, and a collar or sleeve 118 that fits in the openings 116 between the panel 112 and the nozzles 114. A jumper or transfer conduit 120 (FIG. 6) may be connected to the nozzles through well-known clamp assemblies (not shown). Where the transfer panel assembly is to be used in sterile processing environments, the panel 100, nozzles 114, sleeve 118, and any jumper conduits 120 that may be used are preferably constructed of stainless steel material.

Figure 3:
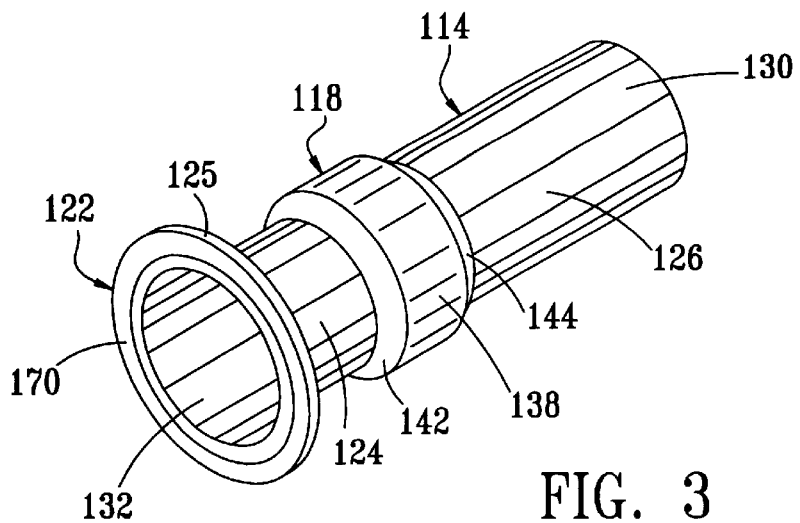
FIG. 3 is an isometric view of a nozzle and sleeve assembly according to the invention.

With additional reference to FIG. 3, each nozzle 114 includes a ferrule 122 formed at a forward end 124 of a tube or conduit 126. The outer surface 125 of the ferrule 122 is larger in diameter than the tube 126 and includes an opening with an inner diameter that is substantially equal to the inner diameter of the tube 124. The ferrule 122 is preferably formed in a separate operation and welded to the tube. The welding operation preferably involves butt welding the components together, wherein a rear surface 128 (FIG. 6) of the ferrule 122 and a forward edge 129 of the tube 126 are abutted together and aligned such that a center axis of the tube is coincident with a center axis of the ferrule. The ferrule 122 and tube 126 are then simultaneously heated in the vicinity of the rear surface 128 and forward edge 129 with a TIG welder, for example, until the material from each component flows together. Preferably, the butt welding is performed without filler material that typically accompanies other welding techniques. In some applications, it may be desirable to purge the tube 126 with an inert gas, such as Argon, while welding in order to prevent oxidation on an inner surface 132 of the tube. The temperature to which the material is heated during welding and the welding velocity are dependent on the type of material used and the thickness of the tube. Preferably, the temperature and welding velocity are chosen so that the weld fully penetrates the wall of the tube. The welding can be automated with the welding temperature and velocity set to assure a strong bond between the flange and tube. After welding, any welding bead that may have been produced is mechanically polished from the inner surface 132 and outer surface 130 of the tube 126.

In an alternative construction, the ferrule 122 may be machined directly on the tube or may be formed on the tube through other known forming processes.

Figure 4:
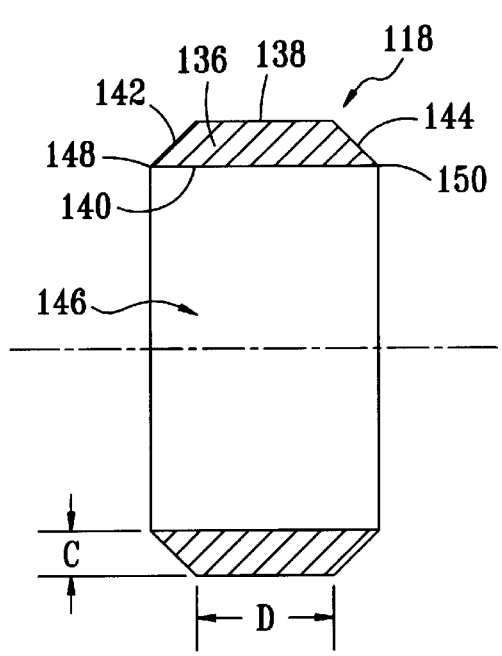
FIG. 4 is a cross sectional view of a sleeve according to one embodiment of the invention.

With further reference to FIG. 4, each sleeve 118 includes an annular body 136 with an outer surface 138 and a bore 146 with an inner surface 140. A forward chamfered surface 142 and a rearward chamfered surface 144 extend between the inner and outer surfaces. The diameter of the bore 136 is substantially equal to the outer diameter of the tube 126 so that the sleeve 118 can be slipped over the tube and affixed thereon.

Preferably, the sleeve 118 is positioned a predetermined distance from the ferrule 122 and then seal-welded on the tube 126 at a forward edge 148, which is the intersection of the forward chamfered surface 142 and inner surface 140, and a rearward edge 150, which is the intersection of the rearward chamfered surface 144 and the inner surface 140. Seal welding is preferably accomplished with a TIG welder, and is performed without filler material that typically accompanies other welding techniques. In some applications, it may be desirable to again purge the tube 126 with an inert gas while welding in order to prevent oxidation on the inner surface 132 of the tube. The temperature to which the material is heated during welding and the welding velocity are again dependent on the type of material used and the thickness of the tube. Preferably, the temperature and welding velocity are chosen so that the weld does not fully penetrate the wall of the tube. The welding can be automated with the welding temperature and velocity set to assure a strong bond between the sleeve and tube. After welding, any welding bead that may have been produced is mechanically polished from the outer surface 130 of the tube 126. However, since no filler material is used, the welding bead will be relatively small since the weld does not penetrate through the wall of the tube. In many instances, the welding bead will not require grinding. Since the weld does not fully penetrate the wall of the tube, the inner surface 132 of the tube will normally not be affected.

Although the sleeve 118 can be formed without chamfered surfaces, they serve to facilitate clean-up both during manufacture and in use since sharp corners between the tube and sleeve are eliminated, where dirt and other particles could otherwise become entrapped. In addition, the chamfered surfaces provide an aesthetically pleasing transition between the tube 126 and the sleeve 118. The thickness "C" between the inner and outer surfaces of the sleeve is chosen so that when the sleeve is welded to the panel 112, heat dissipation generated from the welding operation will not affect the inner surface 132 of the tube 126. The length "D" of the outer surface 138 may vary greatly depending on the thickness of the panel 112, but is preferably at least long enough to compensate for panel thickness and common panel deformities. For example, a panel thickness of 0.25 inch and a total deformation of 0.25 inch for dips and 0.25 inch for bows, the length "D" should be approximately 0.75 inches. This dimension, of course, is given only by way of example and can vary greatly.

Although the outer surface 138 of the sleeve 118 is shown as circular in cross section, the outer surface may have other cross sectional shapes including, but not limited to square, rectangular, hexagonal, oval, star, and so on, as long as the cross dimension of the outer surface, i.e. a distance between opposing sides of the sleeve 118, is substantially constant throughout an axial length of the sleeves.

In an alternative construction, the sleeve 118 may be machined directly on the tube or may be formed on the tube through other known forming processes.

After the sleeve and ferrule are affixed to the tube, the inner surface 132 of the tube 126 is preferably electro-polished to provide a very smooth and uniform mirror-like surface that resists oxidation. If desired, the entire nozzle can be electro-polished to resist oxidation and provide a more aesthetic appearance. After electro-polishing, the nozzle is inspected for determining the quality of the inner surface 132. If the inner surface is nonuniform, or if there are pits or other surface imperfections, the nozzle can be rejected before it is installed on the panel 112. This offers a great advantage over the prior art, wherein electro-polishing occurs after the prior art nozzles are welded to the flow panel. Since surface imperfections are normally not noticed or cannot practically be measured until after electro-polishing, the nozzle must be ground out or the entire panel must be discarded if surface imperfections are found. In a large panel with several nozzles, this can be very disadvantageous in terms of manufacturing time and costs.

The present invention is particularly advantageous in that several nozzles with the same or various sizes of ferrules, tubes, and sleeves can be manufactured in advance and inspected before affixing the nozzles to transfer panels. In this manner, the prior art labor-intensive and time consuming task of grinding out one or more reject nozzles, and/or the cost of discarding the old transfer panel assembly and manufacturing a new transfer panel assembly with the same attendant risks are eliminated.

Figure 5:
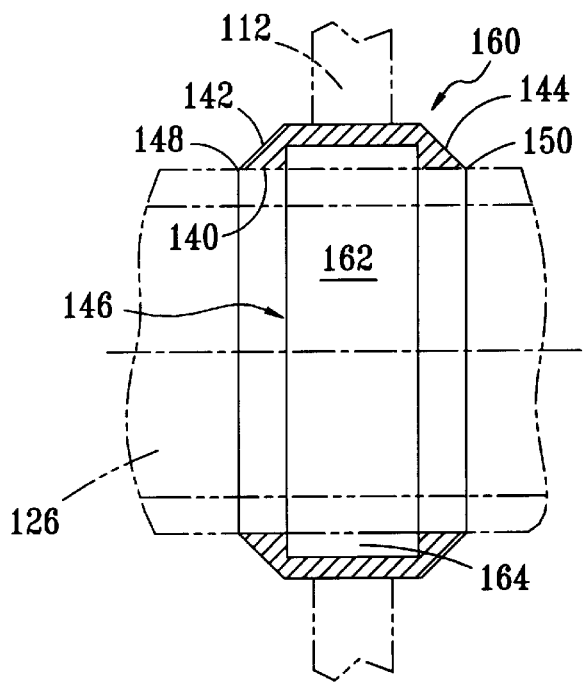
FIG. 5 is a cross sectional view of a sleeve according to a further embodiment of the invention.

Referring now to FIG. 5, a cross section of a sleeve 160 according to a further embodiment of the invention is illustrated, wherein like parts in the previous embodiment are represented by like numerals. The sleeve 160 is similar in construction to the sleeve 118 with the exception of an annular groove 162 formed on the inner surface 140 of the sleeve. The sleeve 160 is installed on the tube 126 (shown in phantom line) in the same manner as sleeve 118 previously described. When installed, the groove 162 together with the outer surface 130 of the tube 126 form an annular pocket 164 that insulates the tube from dissipated heat during welding of the sleeve 160 to the panel 112 (also shown in phantom line). With this arrangement, it is contemplated that the thickness "C" of the nozzle may be reduced, as well as the size of the opening 116 in panel 112.

Figure 6:
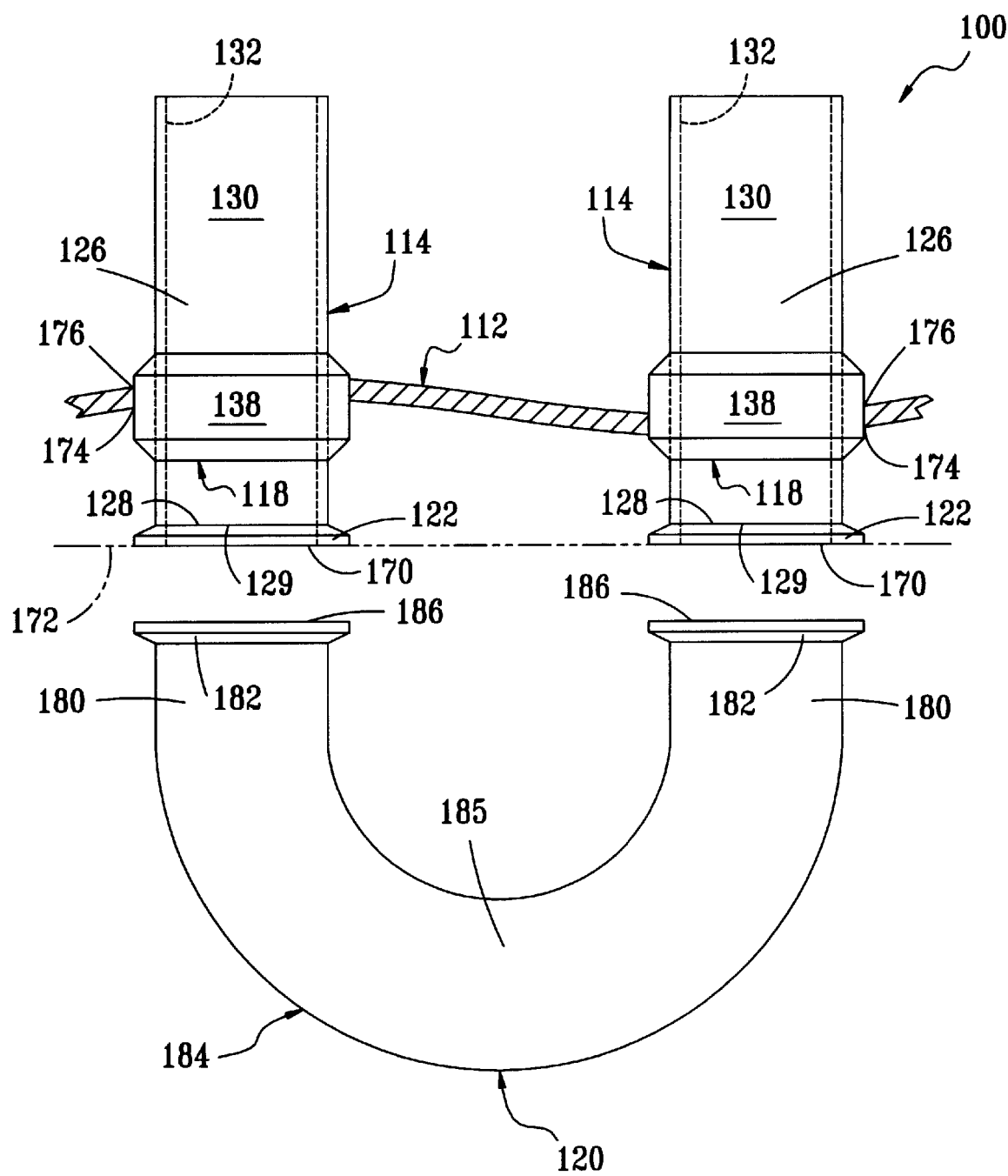
FIG. 6 is a top plan view in partial cross section of the transfer panel assembly according to the invention.

As shown in FIGS. 2 and 6, the transfer panel assembly 100 is constructed by forming openings 116 in the panel 112 then inserting a nozzle 114 into each opening such that the sleeve 118 (or 160) is positioned in each opening and an outer face 170 of each ferrule 122 is positioned in a common plane 172 (shown in phantom line). The plane 172 is preferably a reference surface with an acceptable flatness and the outer faces 170 of the ferrules are positioned in abutting relationship with the reference surface. Subsequently, the sleeves 118 (or 160) are affixed to the panel 112, preferably by seal welding the outer surface 138 of each sleeve to an outer circumferential edge 174 and an inner circumferential edge 176 of the opening 116. In this manner, the nozzles are affixed to the panel 112 with the outer faces of each ferrule 122 lying in a common plane, even when the panel includes dips and bows and/or other deformities.

Although the reference surface 172 and panel are shown oriented vertically in FIG. 2, it is to be understood that the reference surface and panel can be oriented horizontally during assembly of the nozzles to the panel, or in any other orientation, as long as the outer faces of the ferrules are aligned in a common plane.

With particular reference now to FIG. 6, a jumper or transfer conduit 120 includes a ferrule 182 connected at the ends of a U-shaped tube 184. The U-shaped tube 184 includes a pair of leg portions 180 and a curved portion 185 extending therebetween. Depending on the distance between nozzles to be connected, the curved portion 185 may include a straight section (not shown). The ferrules 182 include a face 186 that lie in a common plane. When the jumper conduit 120 is installed on the transfer panel assembly 100, the faces 186 and 170 will be in abutting relationship, independent of any panel deformations or other imperfections. A clamp (not shown) can then be installed over the ferrules 182 and 122 in a well-known manner to thereby affix the jumper conduit to a pair of nozzles. Although a particular type of ferrule is shown for both the nozzles 114 and jumper conduit 120, it is to be understood that ferrules with mutually engaging threads, or other means for connecting the jumper conduit to the nozzles are well within the scope of the present invention.

With the above-describe arrangement, a plurality of jumper conduits 120 can now be constructed at the manufacturer as a standard part. Thus, it is no longer necessary to custom form jumper conduits in the field during assembly as in the prior art due to changes in surface contour or other deformities in the transfer panel.

It is to be understood that the terms forward, rearward, inner, outer, and their respective derivatives as used herein denote relative, rather than absolute positions or locations.

While the invention has been taught with specific reference to the above-described embodiments, those skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. A method of constructing a panel assembly for transferring fluids from one location to another, the method comprising:
    providing a panel with at least one opening;
    forming at least one nozzle with a tubular portion and at least one connection end;
    forming a sleeve on the tubular portion with an outer surface, having an axial length that is greater than a combination of a thickness of the panel and any deformity on the panel;
    polishing an inner surface of the tubular portion;
    inspecting the inner surface for defects;
    rejecting the at least one nozzle when inner surface defects are discerned to thereby preclude installation of the at least one nozzle on the panel;
    accepting the at least one nozzle when no inner surface defects are discerned; and
    installing the at least one accepted nozzle on the panel after the polishing and inspecting steps by a) inserting the tubular portion into the at least one opening in the panel until the sleeve is positioned within the at least one opening, and b) affixing the outer surface of the sleeve to the panel in the vicinity of the at least one opening.

2. A method according to claim 1, wherein the step of forming a sleeve on the tubular portion includes seal welding the sleeve to an outer surface of the tubular portion.

3. A method according to claim 1, wherein the outer surface of the sleeve has a substantially constant cross dimension along the axial length of the surface.

4. A method according to claim 3, wherein the step of forming a sleeve further comprises forming an inner sleeve surface and an annular chamfered surface at opposite ends of the sleeve, each annular chamfered surface extending between the outer sleeve surface and the inner sleeve surface.

5. A method according to claim 4, wherein the step of forming a sleeve includes seal welding the sleeve to an outer surface of the tubular portion at a junction of at least one of the annular chamfered surfaces and the inner sleeve surface.

6. A method according to claim 5, wherein the step of affixing the outer surface of the sleeve to the panel comprises welding the sleeve to the panel.

7. A method according to claim 1, wherein the step of affixing the outer surface of the sleeve to the panel comprises welding the sleeve to the panel.

8. A method according to claim 7, wherein the step of forming a sleeve includes forming an inner sleeve surface with an annular groove, the annular groove together with an outer surface of the tubular portion forming an insulative pocket to thereby reduce heat transfer to the tubular portion from the step of welding the sleeve to the panel.

9. A method according to claim 1, and further comprising:
    aligning the connection end of the tubular portion with a reference plane that is spaced from the panel and extends in a direction generally transverse to a longitudinal axis of the at least one nozzle prior to affixing the outer surface of the sleeve to the panel, such that alignment of the connection end with the reference plane is independent of any deformity associated with the panel.

10. A method according to claim 1 wherein the step of polishing includes electro-polishing.

11. A method of constructing a panel assembly for transferring fluids from one location to another, the method comprising:
    providing a panel with at least one opening;
    forming at least one nozzle with a tubular portion and at least one connection end;
    forming a sleeve on the tubular portion, the sleeve having an outer surface with an axial length that is greater than a combination of a thickness of the panel and any deformity on the panel;
    polishing an inner surface of the tubular portion;
    inspecting the inner surface for defects; and
    installing the at least one nozzle on the panel by a) inserting the tubular portion into the at least one opening in the panel until the sleeve is positioned within the at least one opening, and b) welding the outer surface of the sleeve to the panel in the vicinity of the at least one opening;
    wherein the step of forming a sleeve includes forming an annular groove on the inner sleeve surface, the annular groove together with an outer surface of the tubular portion forming an insulative pocket to thereby reduce heat transfer to the tubular portion from the step of welding the sleeve to the panel;
    whereby defects that may be present on the inner surface of the tubular portion can be discovered before installing the nozzle on the panel, and potential inner surface defects are precluded during installation of the nozzle on the panel.

12. A method of constructing a panel assembly for transferring fluids from one location to another, the method comprising:
    providing a panel with a plurality of openings;
    forming a plurality of nozzles, each nozzle including a tubular portion and at least one connection end;
    forming a sleeve on each tubular portion, each sleeve having an outer surface with an axial length that is greater than a combination of a thickness of the panel and any deformity on the panel; and installing the plurality of nozzles on the panel by a) inserting the tubular portions into the openings in the panel with a portion of the sleeves extending through the openings, b) aligning the connection ends of the tubular portions in a common reference plane that is spaced from the panel and extends in a direction generally transverse to a longitudinal axis of each nozzle and c) affixing an outer surface of the sleeves to the panel in the vicinity of the openings;

wherein alignment of the connection ends with the common reference plane is independent of any deformity on the panel.

13. A method according to claim 12, and further comprising:

polishing an inner surface of the tubular portions; and inspecting the inner surface of each tubular portion for defects before the step of installing the plurality of nozzles on the panel.

14. A method according to claim 13, wherein the step of forming a sleeve on the tubular portion includes seal welding the sleeve to an outer surface of the tubular portion.

15. A method according to claim 13, wherein the outer surface of each sleeve is formed with a substantially constant cross dimension along the axial length of the surface.

16. A method according to claim 15, wherein the step of affixing the outer surface of each sleeve to the panel comprises welding each sleeve to the panel.

17. A method according to claim 16, wherein the step of forming a sleeve includes forming an inner sleeve surface with an annular groove, the annular groove together with an outer surface of each tubular portion forming an insulative pocket to thereby reduce heat transfer to the tubular portion from the step of welding the sleeves to the panel.

18. A method according to claim 13 wherein the step of polishing includes electro-polishing.

* * * * *